United States Patent
Kato (10) Patent No.: US 10,782,523 B2
(45) Date of Patent: Sep. 22, 2020

(54) ON-VEHICLE DISPLAYS DEVICE

(71) Applicant: ALPINE ELECTRONICS, INC., Tokyo (JP)

(72) Inventor: Ichiro Kato, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 107 days.

(21) Appl. No.: 16/223,555

(22) Filed: Dec. 18, 2018

(65) Prior Publication Data
US 2019/0235245 A1 Aug. 1, 2019

(30) Foreign Application Priority Data

Feb. 1, 2018 (JP) .................................. 2018-016091

(51) Int. Cl.
*G02B 27/01* (2006.01)
*G02B 7/00* (2006.01)
(Continued)

(52) U.S. Cl.
CPC ......... *G02B 27/0149* (2013.01); *G02B 7/008* (2013.01); *G02B 27/0101* (2013.01);
(Continued)

(58) Field of Classification Search
CPC ....... B60R 1/00; B60R 11/00; B60R 11/0229; B60R 2011/0005; B60R 2011/008; G02B 27/01; G02B 27/0101; G02B 27/0149; G02B 7/008; G02B 2027/0121; G02B 2027/015; G02B 2027/0154; G02B 2027/0159; G02B 2027/0181; G02B 7/00
See application file for complete search history.

(56) References Cited

U.S. PATENT DOCUMENTS 6,809,872 B2 * 10/2004 Eberhardt .......... G02B 27/0149
345/7
8,674,646 B2 * 3/2014 Oomori .................. B60K 35/00
318/696

(Continued)

FOREIGN PATENT DOCUMENTS

CN 206863347 U 1/2018
DE 100 44 221 A1 4/2001
(Continued)

OTHER PUBLICATIONS

Extended European Search Report for European Patent Application No. 19153296.9 dated Jul. 1, 2019; 7 pages.

*Primary Examiner* — Balram T Parbadia
(74) *Attorney, Agent, or Firm* — Brinks Gilson & Lione (57) ABSTRACT

In an on-vehicle display device, projection light output from a projecting unit is reflected on an intermediate mirror and is further reflected on a directional mirror. The reflected light is directed to a windshield glass as directed reflected light. In an adjustment operation, the directional mirror is rotated around tilting fulcrum parts by a driving unit to adjust the height of a virtual image formed in front of the windshield glass. In a retracting operation, the lower end of the directional mirror is largely moved forward by the driving unit, rotating the directional mirror with an abutting point between the directional mirror and the upper support acting as a fulcrum. This prevents external light (sunlight) from adversely affecting the projecting unit.

5 Claims, 5 Drawing Sheets (51) Int. Cl.
*B60R 11/00* (2006.01)
*B60R 11/02* (2006.01)

(52) U.S. Cl.
CPC ... *B60R 11/0229* (2013.01); *B60R 2011/0005* (2013.01); *G02B 2027/015* (2013.01); *G02B 2027/0121* (2013.01); *G02B 2027/0154* (2013.01); *G02B 2027/0159* (2013.01); *G02B 2027/0181* (2013.01)

(56) References Cited

U.S. PATENT DOCUMENTS

| | | | |
|---|---|---|---|
| 10,131,228 B2 * | 11/2018 | Aoki | G02B 26/0816 |
| 2005/0162340 A1 * | 7/2005 | Nagano | G02B 27/0149 |
| | | | 345/7 |
| 2006/0291066 A1 | 12/2006 | Shiobara et al. | |
| 2008/0212196 A1 * | 9/2008 | Watanabe | G02B 27/01 |
| | | | 359/632 |
| 2015/0098133 A1 * | 4/2015 | Laycock | G02B 7/023 |
| | | | 359/632 |
| 2016/0193922 A1 * | 7/2016 | Kuzuhara | G02B 27/0101 |
| | | | 345/7 |
| 2018/0003964 A1 * | 1/2018 | Tatsuno | B60K 35/00 |
| 2019/0107717 A1 * | 4/2019 | Heinrich | B60K 37/00 |

FOREIGN PATENT DOCUMENTS

| | | |
|---|---|---|
| EP | 1 500 548 A1 | 1/2005 |
| JP | 2007-086226 | 4/2007 |

\* cited by examiner

ON-VEHICLE DISPLAYS DEVICE

RELATED APPLICATIONS

The present application claims priority to Japanese Patent Application Number 2018-016091, filed Feb. 1, 2018, the entirety of which is hereby incorporated by reference.

BACKGROUND

1. Field

The present disclosure relates to an on-vehicle display device structured so that the driver of a vehicle can view a virtual image formed in front of a transparent screen such as a windshield glass or a combiner through the transparent screen.

2. Description of the Related Art

Disclosures related to an on-vehicle display device used as a head-up display device are described in Japanese Unexamined Patent Application Publication Nos. 2004-90713 and 2007-86226.

The on-vehicle display device described in each patent document has a projecting unit that outputs projection light with which an image is projected, and also a mirror that reflects the projection light output from the projecting unit to direct the reflected light toward a windshield glass or combiner, which is a type of transparent screen. The reflected light from the mirror is half-reflected on the transparent screen and is viewable by the driver. Accordingly, the driver can view a virtual image formed in front of the transparent screen.

In this type of on-vehicle display device, a lens is provided in the projecting unit and a concave mirror is used as the mirror. A display image formed by the projecting unit is enlarged as a virtual image. The enlargement ratio of the virtual image is determined depending on the magnification ratios of the lens and concave mirror. While the on-vehicle display is not in use (i.e., with the ignition switch turned off), when external light (sunlight) is transmitted through the transparent screen and enters the on-vehicle display, the light is reflected on the mirror and enters the lens of the projecting unit. At that time, the external light is focused toward the projecting unit, raising temperature in the projecting unit. This causes deterioration in the light source and liquid crystal display (LCD).

In view of this, in the on-vehicle display described in Japanese Unexamined Patent Application Publication No. 2004-90713, a mirror (reflecting member 12) is supported so as to be tilted with an axial part 13a, provided at the center between the upper end and lower end of a holding member 13, acting as a fulcrum. The reflecting member 12 is rotated by a driving member 14. As illustrated in FIG. 2 in Japanese Unexamined Patent Application Publication No. 2004-90713, an angle through which the reflecting member 12 is rotated can be adjusted between an eye range C and a lower-limit position B below the eye range C. When the angle of the reflecting member 12 is changed within the eye range C, the position of a virtual image can be adjusted within the driver's field of view. When the reflecting member 12 is rotated to the lower-limit position B, external light (sunlight) is not reflected toward the projecting unit (indicator 11).

In the on-vehicle display device described in Japanese Unexamined Patent Application Publication No. 2007-86226, a mirror 30 can be rotated with its upper end 30A acting as a fulcrum. While the ignition switch is turned on, an image is projected on a combiner 50A, which is a type of transparent screen, enabling the driver to view a virtual image 54. When the ignition switch is turned off, a mirror unit 60 is rotated with its lower end directed toward the backward direction and a virtual image 54 is gradually moved downward, deleting the virtual image 54. This prevents external light from adversely affecting a projector unit 10.

SUMMARY

The on-vehicle display device described in Japanese Unexamined Patent Application Publication No. 2004-90713 has a structure in which the reflecting member 12 is rotated around the axial part 13a provided at the center between the upper end and lower end of the holding member 13. To set the angular position of the reflecting member 12 to the lower-limit position B below the eye range C indicated in FIG. 2 in Japanese Unexamined Patent Application Publication No. 2004-90713, therefore, the reflecting member 12 needs to be largely rotated clockwise around the axial part 13a. At that time, the lower end of the reflecting member 12 needs to be largely moved in the backward direction, which is a direction away from the indicator 11, so the internal space of a housing 20 needs to be expanded backward. As a result, the downsizing of the on-vehicle display device is impaired.

The on-vehicle display device described in Japanese Unexamined Patent Application Publication No. 2007-86226 has a structure in which while the ignition switch is turned off, the lower end of the mirror 30 is largely rotated in the backward direction, which is a direction away from the projector unit 10, with the upper end 30A of the mirror 30 acting as a fulcrum. To move the lower end in the backward direction, therefore, the backward depth dimension of a case 16 needs to be elongated. In the structure in which the mirror 30 is rotated with its upper end 30A acting as a fulcrum, when the lower end of the mirror 30 is moved in the front-back direction, the reflection angle of the mirror 30 only slightly changes. Therefore, if the structure described in Japanese Unexamined Patent Application Publication No. 2007-86226 is used to adjust the position of a virtual image within the driver's field of view, the lower end of the mirror 30 needs to be largely moved in the front-back direction. This requires extra space for the movement in the case 16.

The present disclosure addresses the above conventional problems with the object of providing an on-vehicle display device that can efficiently perform an adjustment operation for a directional mirror to adjust the focal position of a virtual image, and a retracting operation for the directional mirror to reduce the effect of external light on a projecting unit, and that requires only narrow operation space in which the directional mirror is rotated.

In an on-vehicle display device that has a projecting unit that outputs projection light, and also has a directional mirror that reflects the projection light and directs the reflected light of the projection light upward at an oblique angle toward a transparent screen positioned in front of a driver seat, the on-vehicle display device in the present disclosure is characterized as comprising: a tilting fulcrum part positioned between the upper end and lower end of the directional mirror, the tilting fulcrum part being attached to the directional mirror; a fulcrum support configured to support the tilting fulcrum part; a biasing member configured to provide the directional mirror a biasing force with which the tilting fulcrum part is pressed against the fulcrum support; an upper support positioned above the fulcrum support so as to face the back of the directional mirror, the back being opposite to the reflecting surface of the directional mirror; and a driving unit configured to perform an adjustment operation in which the driving unit provides the directional mirror a force at a position below the fulcrum support so that the directional mirror is tilted in a state in which the tilting fulcrum part is supported by the fulcrum support, and to perform a retracting operation in which the driving unit provides the directional mirror a force directed forward in a reflection direction so that the back comes into contact with the upper support, and the directional mirror is rotated with a point of the contact acting as a fulcrum in a state in which the tilting fulcrum part being apart from the fulcrum support.

In the on-vehicle display device in the present disclosure, the position of a virtual image formed in front of the transparent screen relative to the position of the driver seat is adjusted by the adjustment operation, and the orientation of the directional mirror is set by the retracting operation so that external reflected light resulting from the reflection of external light on the directional mirror does not adversely affect the projecting unit.

In the on-vehicle display device in the present disclosure, an intermediate mirror configured to direct projection light output from the projecting unit toward the directional mirror may be provided between the projecting unit and the directional mirror.

In the on-vehicle display device in the present disclosure, at least one of the directional mirror and the intermediate mirror is a concave mirror.

In the on-vehicle display device in the present disclosure, the driving unit has an actuator configured to perform the adjustment operation and the retracting operation as a series of operation.

However, it is also possible for the driving unit to have, as separate mechanisms, an actuator configured to rotate the directional mirror around the tilting fulcrum part in the adjustment operation, and another actuator configured to move the directional mirror toward the front in the reflection direction with the point in the contact acting as a fulcrum in the retracting operation.

In the on-vehicle display device in the present disclosure, a directional mirror is tilted around a tilting fulcrum part set between the upper end and lower end of the directional mirror in an adjustment operation so as to change a reflection angle. Therefore, when the angle of the directional mirror is changed within an adjustment range, amounts by which the upper end and lower end of the directional mirror are moved can be lessened. This makes it possible to perform a precise adjustment operation by rotating the directional mirror in a narrow rotation space.

In a retracting operation, the directional mirror is moved toward the front in a reflection direction with a contact point, set above a tilting fulcrum part, acting as a fulcrum. Therefore, the upper end of the directional mirror does not need to be largely moved backward beyond the adjustment range in the adjustment operation. This eliminates the need for a wide space in the on-vehicle display device that would otherwise be required to provide a rotation range for the directional mirror.

DESCRIPTION OF THE PREFERRED EMBODIMENTS

Figure 1:
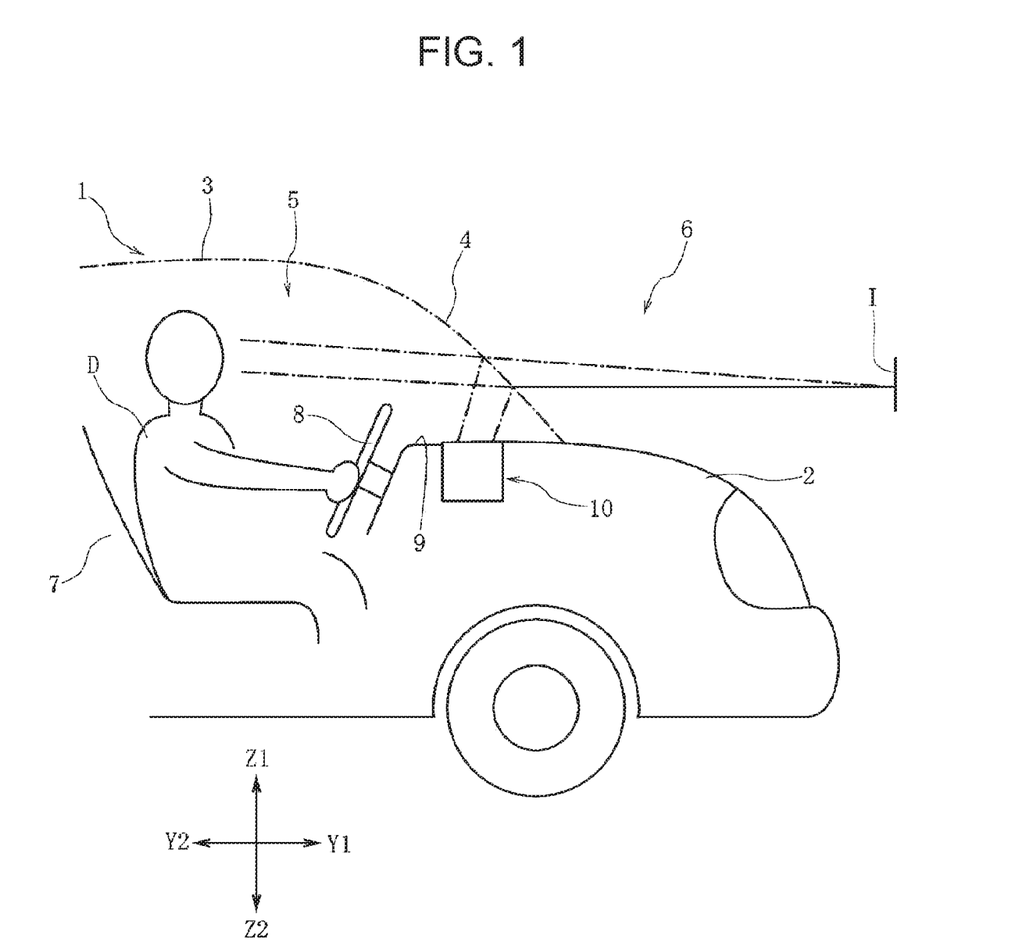
FIG. 1 illustrates a state in which an on-vehicle display device in an embodiment of the present disclosure is mounted in a vehicle.

FIG. 1 illustrates a state in which an on-vehicle display device 10 in an embodiment of the present disclosure is mounted in an automobile 1, which is an example of a vehicle.

A windshield glass 4 is attached between the hood 2 and roof 3 of the automobile 1. The windshield glass 4 is used as a partition between an interior space 5 and an external space 6 in front of the automobile 1. The windshield glass 4 is curved. The inner surface of the windshield glass 4 faces the interior space 5, and the outer surface of the windshield glass 4 faces the external space 6 in front of the automobile 1. In the embodiment of the present disclosure, the windshield glass 4 functions as a transparent screen having a concave curved surface.

A combiner may be used as a transparent screen, instead of the windshield glass 4. The combiner, which is formed from a semi-translucent synthetic resin material or the like, is placed inside the windshield glass 4.

A driver seat 7 is provided in the interior space 5, and a steering wheel 8 is provided in front of the driver seat 7. A dashboard 9 is provided at the front of the interior space 5. The on-vehicle display device 10 is embedded in the dashboard 9. The on-vehicle display device 10 is a so-called head-up display (HUD).

The Y1-Y2 direction and Z1-Z2 direction indicated in FIGS. 1 to 5 are directions with respect to the body of the automobile 1. The Y1 direction is the forward direction with respect to the body of the automobile 1, and the Y2 direction is the backward direction with respect to the body of the automobile 1. The Z1 direction is the upward direction with respect to the body of the automobile 1, and Z2 direction is the downward direction with respect to the body of the automobile 1.

Figure 2:
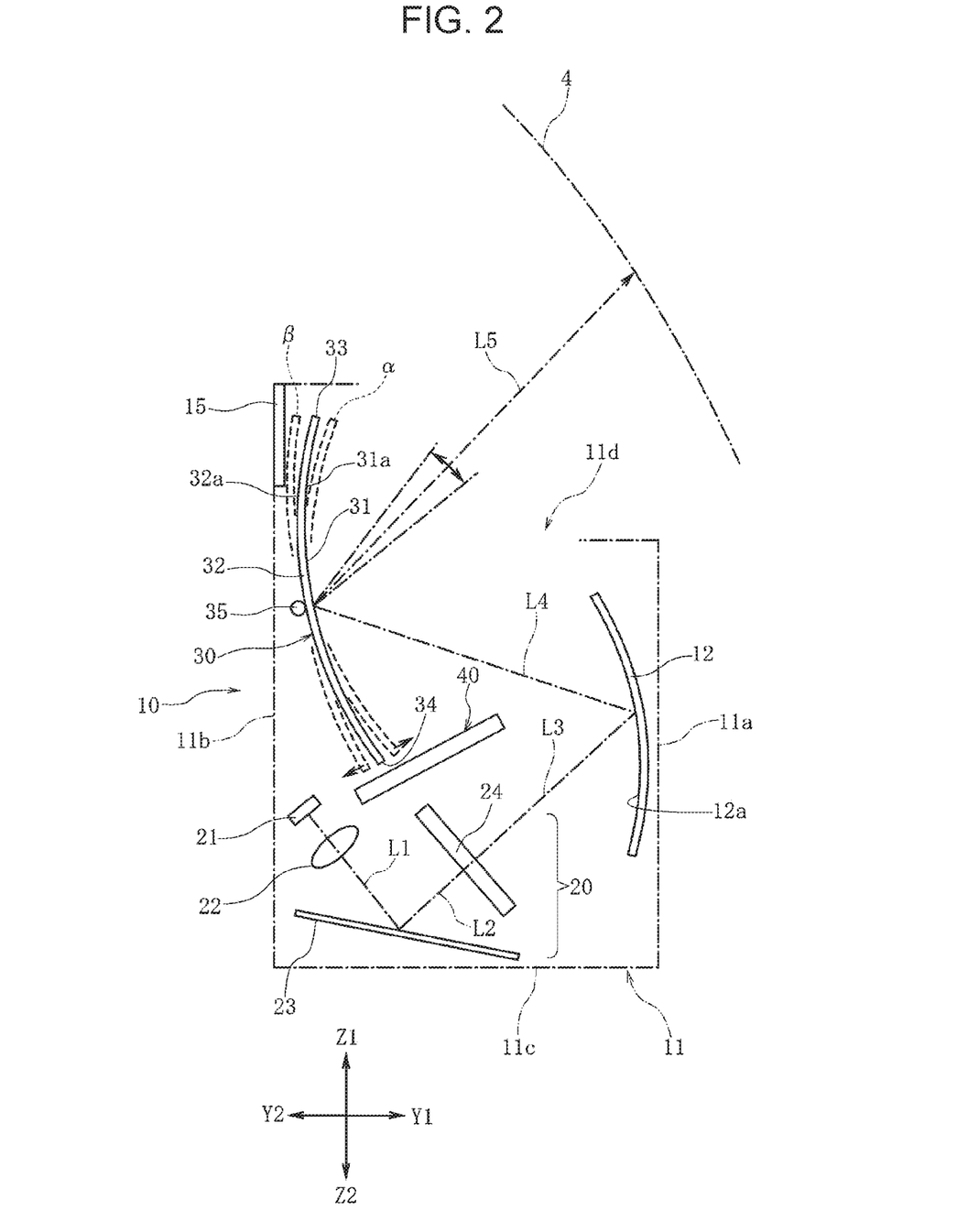
FIG. 2 illustrates the component structure of the on-vehicle display device in an embodiment of the present disclosure, in a state in which an adjustment operation is being performed.
Figure 3:
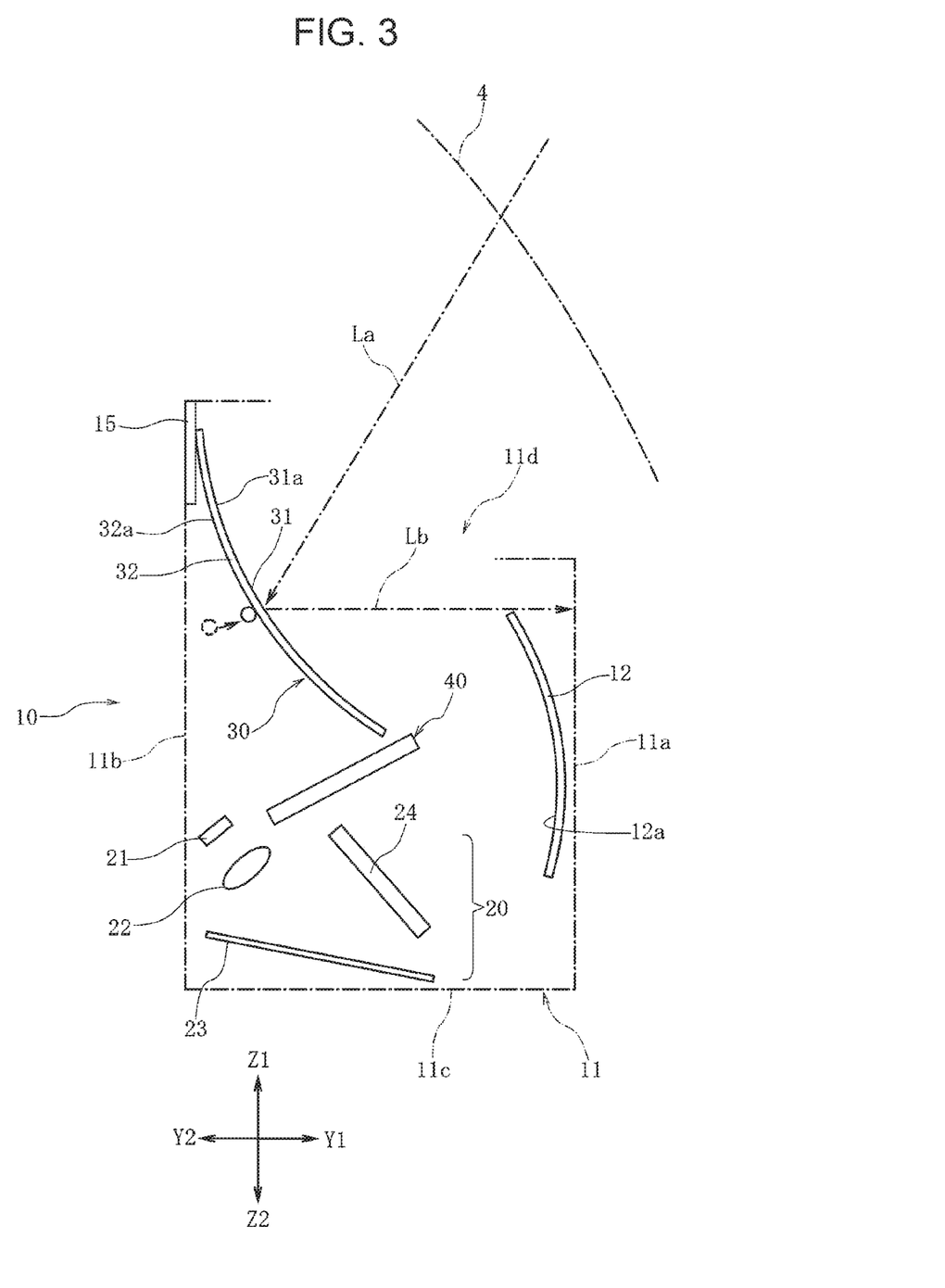
FIG. 3 illustrates the component structure of the on-vehicle display device in an embodiment of the present disclosure, in a state in which a retracting operation is being performed.

FIGS. 2 and 3 illustrate the structure of the on-vehicle display device 10.

The on-vehicle display device 10 has a case 11. The case 11 has a front side 11a oriented forward (in the Y1 direction), a rear side 11b oriented backward (in the Y2 direction), and a bottom 11c oriented downward (in the Z2 direction). The case 11 has an opening 11d, which is open upward and forward (that is, in the Y1 direction and Z1 direction). The windshield glass 4, which is a type of transparent screen, faces the opening 11d that is oriented upward and forward.

A projecting unit 20 is provided at a lower position in the inner space of the case 11. The projecting unit 20 has a light source 21 such as a light-emitting diode (LED). When the ignition switch of the automobile 1 is turned on, the light source 21 lights. As illustrated in FIG. 2, the projecting unit 20 has a lens 22 through which light from the light source 21 passes, a plane mirror 23 that reflects a luminous flux L1 that has passed through the lens 22, and an image creating unit 24 that causes reflected light L2, which is created when the reflected light L1 is reflected on the plane mirror 23, to pass through the image creating unit 24. The image creating unit 24 has a transmission-type liquid crystal display cell. Projection light L3, which has passed through the image creating unit 24 in the projecting unit 20, is output upward and forward.

The projecting unit 20 may be of a type in which a liquid crystal on silicon (LCOS) element or a digital light processing (DLP) projector, which is a reflection-type device, is used, instead of having a structure in which a transmission-type liquid crystal display cell is used to create projection light.

In the case 11, an intermediate mirror 12 is fixedly provided inside the front side 11a of the case 11 in front of and above the projecting unit 20. The intermediate mirror 12 is a concave mirror. The reflecting surface 12a of the intermediate mirror 12 is oriented backward and downward. The projection light L3 output from the projecting unit 20 is reflected on the reflecting surface 12a of the intermediate mirror 12 as intermediate reflected light L4.

A directional mirror 30 is provided inside the rear side 11b of the case 11. The directional mirror 30 has a concave mirror 31 and a supporting body 32 that supports the concave mirror 31. The reflecting surface 31a of the concave mirror 31 is oriented forward. The back of the supporting body 32, that is, the back 32a of the directional mirror 30, is oriented toward the inner surface of the rear side 11b of the case 11.

The directional mirror 30 is positioned close to the opening 11d of the case 11. The directional mirror 30 has an upper end 33 oriented upward (in the Z1 direction); the windshield glass 4, which is a type of transparent screen, is positioned above the upper end 33. The directional mirror 30 also has a lower end 34 oriented toward the bottom 11c of the case 11. Tilting fulcrum parts 35 are provided on the supporting body 32 of the directional mirror 30 between the upper end 33 and the lower end 34. The tilting fulcrum parts 35 are provided at both ends of the directional mirror 30 in a direction orthogonal to the surface of the drawing sheet in FIGS. 2 and 3.

Although each tilting fulcrum part 35 is disposed between the upper end 33 and the lower end 34, the position at which the tilting fulcrum part 35 is disposed is any position from the upper end 33 to the lower end 34, excluding the upper end 33 and lower end 34. However, the tilting fulcrum part 35 is preferably disposed at the midpoint between the upper end 33 and the lower end 34, that is, at a position at which the distance from the upper end 33 to the lower end 34 along the reflecting surface 31a is divided into half.

Figure 4:
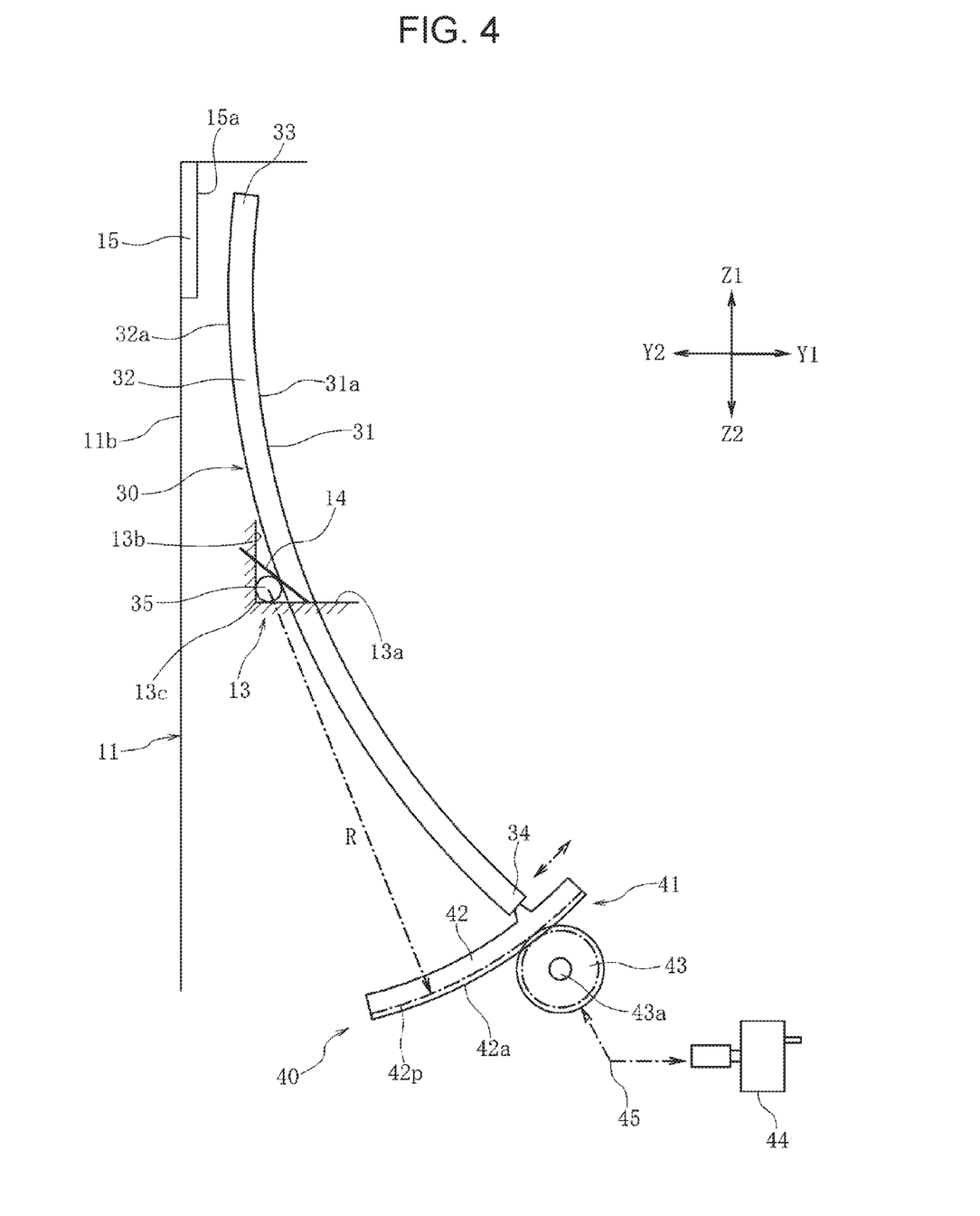
FIG. 4 is an enlarged view illustrating the structures of a directional mirror and driving unit that are provided in the on-vehicle display device in an embodiment of the present disclosure, in a state in which a display operation is being performed.
Figure 5:
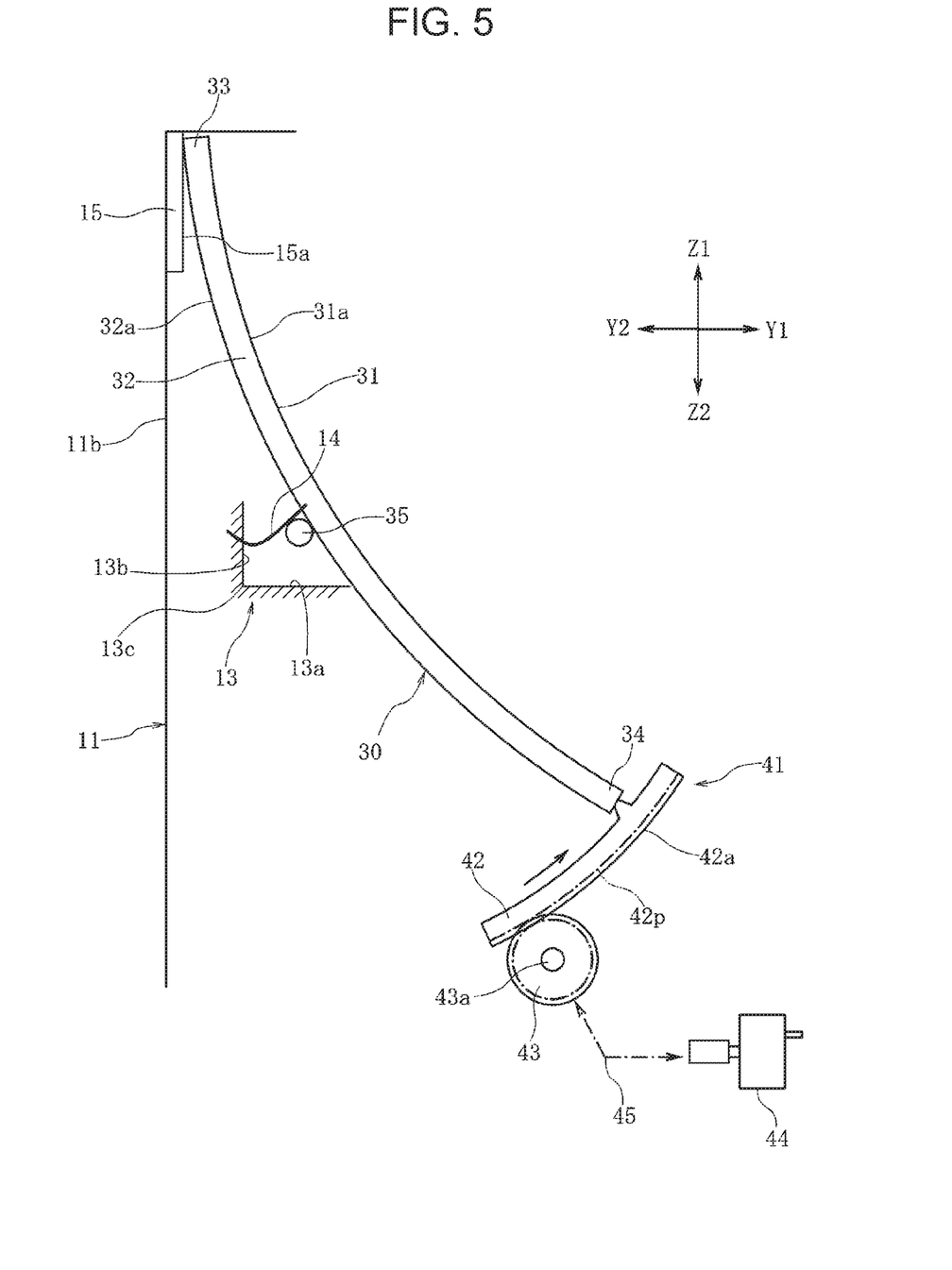
FIG. 5 is an enlarged view illustrating the structures of the directional mirror and driving unit that are provided in the on-vehicle display device in an embodiment of the present disclosure, in a state in which a retracting operation is being performed.

As illustrated in FIGS. 4 and 5, a fulcrum support 13 is fixedly attached to the inside of the rear side 11b of the case 11. The fulcrum support 13 has a horizontal support surface 13a, which faces upward and extends in the front-back direction (Y1-Y2 direction), and a vertical support surface 13b, which faces forward and extends vertically (in the Z1-Z2 direction). An angular support 13c at right angles is formed on the boundary between the horizontal support surface 13a and the vertical support surface 13b.

The base of a leaf spring 14, which is a type of biasing member, is embedded in the vertical support surface 13b of the fulcrum support 13 so as to be fixed. The leaf spring 14 abuts the tilting fulcrum parts 35, which causes the tilting fulcrum parts 35 to be pressed against the angular support 13c of the fulcrum support 13 due to the elastic force of the leaf spring 14. Although, in this embodiment, the tilting fulcrum parts 35 are directly pressed by the leaf spring 14, this is not a limitation; the supporting body 32 of the directional mirror 30 may be pressed by the leaf spring 14 and the tilting fulcrum parts 35 may thereby be pressed against the fulcrum support 13. The biasing member is not limited to the leaf spring 14; a helical extension spring or helical compression spring may be used instead.

As illustrated in FIGS. 2 and 3, a driving unit 40 that provides a force to the lower end 34 of the directional mirror 30 is provided inside the case 11. As illustrated in FIGS. 4 and 5, in the on-vehicle display device 10 in this embodiment, the driving unit 40 has a single actuator 41.

The actuator 41 has a rack 42 fixed to the lower end 34 of the directional mirror 30. The teeth 42a of the rack 42 are oriented forward and downward. The teeth 42a have a continuous pitch circle 42p. The pitch circle 42p extends along an arc that has a certain radius R and the center of which is at the axial center of the tilting fulcrum parts 35 attached to the directional mirror 30.

The actuator 41 has a pinion gear 43. The pinion gear 43 is rotatably supported by a gear axis 43a fixed in the case 11. A motor 44 and a reduction gear train 45 that reduces the rotational output of the motor 44 and transmits the reduced rotational output to the pinion gear 43 are provided in the case 11. Details of the structure of the reduction gear train 45 are not illustrated. As illustrated in FIGS. 4 and 5, the leaf spring 14 also functions as a biasing member that keeps the teeth 42a of the rack 42 pressed against the pinion gear 43 to prevent an adverse effect that would otherwise be caused by backlash.

An upper support 15 is provided at the top of the inner surface of the rear side 11b of the case 11. The upper support 15 is formed from a synthetic resin material so that the coefficient of friction of an abutting surface 15a facing forward (in the Y1 direction) is reduced. Alternatively, part of the inner surface of the rear side 11b of the case 11 may be used as the upper support 15 without alternation.

In FIG. 2, α indicates a clockwise rotation limit orientation of the directional mirror 30 when the actuator 41 of the driving unit 40 is operated to perform an adjustment operation and β indicates a counterclockwise rotation limit orientation at that time. The upper support 15 is positioned above the fulcrum support 13 and faces the back 32a of the directional mirror 30 (specifically, the back of the supporting body 32). When the directional mirror 30 is further rotated counterclockwise beyond the counterclockwise rotation limit orientation β during the adjustment operation, the back 32a comes into contact with the upper support 15.

Next, the operation of the on-vehicle display device 10 will be described.

When the ignition switch of the automobile is turned on, the on-vehicle display device 10 is set to the state illustrated in FIGS. 2 and 4. At the actuator 41 of the driving unit 40, the rack 42 has been moved backward (in the Y2 direction) by the pinion gear 43. Therefore, the back 32a of the directional mirror 30 has been separated from the upper support 15 and the tilting fulcrum parts 35 are pressed against the angular support 13c of the fulcrum support 13 due the biasing force of the leaf spring 14.

In this state, in the projecting unit 20, the light source 21 is turned on and the reflected light L1 that has passed through the lens 22 is reflected on the plane mirror 23, after which the reflected light L2 resulting from the reflection of the reflected light L1 passes through the image creating unit 24 and the projection light L3 forming an image created by the image creating unit 24 is output. The projection light L3 is reflected on the reflecting surface 12a of the intermediate mirror 12 and is directed toward the directional mirror 30 as the intermediate reflected light L4. Furthermore, the intermediate reflected light L4 is reflected on the reflecting surface 31a of the concave mirror 31 of the directional mirror 30 and directed reflected light L5 resulting from the reflection of the intermediate reflected light L4 passes through a translucent cover (not illustrated) provided at the opening 11d of the case 11 and illuminates the windshield glass 4.

The windshield glass 4 functions as a slightly curved transparent screen. The directed reflected light L5 directed from the directional mirror 30 as reflected light illuminates the inner surface of the windshield glass 4. Part of the directed reflected light L5 is focused on the eyes of a viewer (driver) D sitting on the driver seat 7. As a result, the viewer D can view a virtual image I formed in the external space 6 in front of the windshield glass 4 through the eyes of the viewer D.

The image created by the image creating unit 24 in the projecting unit 20 is magnified depending on the magnification ratio of the lens 22 and the enlargement ratios (curvatures) of the intermediate mirror 12 and directional mirror 30, resulting in the virtual image I.

The imaging position of the virtual image I in the up-down direction (Z1-Z2 direction) changes depending on the orientation angle of the directed reflected light L5, illustrated in FIG. 2, in the up-down direction. In the on-vehicle display device 10, therefore, when the actuator 41 of the driving unit 40 is operated to vertically move the imaging position of the virtual image I, an adjustment operation to have the virtual image I suit the height of the eyes of the viewer D, that is, an adjustment operation to adjust the position of the virtual image I relative to the position of the driver seat 7, becomes possible.

The adjustment operation is performed by manipulating a manipulation unit provided on an instrument panel or steering wheel 8 to operate the motor 44 provided for the actuator 41. Alternatively, when the viewer D is recognized by a sensor at the driver seat 7, the adjustment operation is performed by retrieving information about the viewer (driver) D from a memory, the information being stored in the memory in advance, and controlling the motor 44 according to the information.

At the actuator 41 illustrated in FIG. 4, when the pinion gear 43 is normally or reversely rotated by the motor 44, the rack 42 moves forward or backward. In an adjustment operation, the directional mirror 30 is rotated between the clockwise rotation limit orientation α and the counterclockwise rotation limit orientation β as illustrated in FIG. 2 and the reflection angle of the directional mirror 30 at the time of stopping is adjusted.

The directional mirror 30 does not come into contact with the upper support 15 in the range from the clockwise rotation limit orientation α to the counterclockwise rotation limit orientation β. In this range, therefore, the tilting fulcrum parts 35 remain in contact with the angular support 13c of the fulcrum support 13. Since the teeth 42a of the rack 42 have the pitch circle 42p that has the radius R and the center of which is at the axial center of the tilting fulcrum parts 35, when the pinion gear 43 is rotated, the angle of the directional mirror 30 is changed between the clockwise rotation limit orientation α and the counterclockwise rotation limit orientation β around the axial center of the tilting fulcrum parts 35. As a result, the orientation angel of the directed reflected light L5, which is diagonally upward, is changed and the height of the virtual image I is changed so as to suit the height of the eyes of the viewer D.

In this adjustment operation, the angular orientation of the directional mirror 30 is adjusted around the tilting fulcrum parts 35, which are positioned between the upper end 33 and the lower end 34, preferably around the tilting fulcrum parts 35 positioned at the midpoint at which the length dimension along the mirror surface between the upper end 33 and the lower end 34 is divided into half. Since the distance between the tilting fulcrum part 35 and the lower end 34, on which a force from the actuator 41 is exerted, is short, even if the rotational angle of the pinion gear 43 is small, the angle of the directional mirror 30 can be largely changed. Since the directional mirror 30 is tilted around the tilting fulcrum parts 35 positioned between the upper end 33 and the lower end 34, distances traveled by the upper end 33 and lower end 34 forward and backward between the clockwise rotation limit orientation α and the counterclockwise rotation limit orientation β are also short. Therefore, the angular orientation of the directional mirror 30 can be largely changed even in a relatively narrow rotation space. When the imaging position of the virtual image I is to be set, therefore, the imaging position can be largely changed vertically.

Next, when a display operation by the on-vehicle display device 10 is stopped by, for example, turning off the ignition switch, the on-vehicle display device 10 performs a retracting operation.

In the retracting operation, the motor 44 for the actuator 41 in the driving unit 40 is started, by which the pinion gear 43 is rotated clockwise and the rack 42 is largely moved forward as illustrated in FIG. 5. At first, the directional mirror 30 is rotated counterclockwise with the tilting fulcrum parts 35 in contact with the fulcrum support 13. When the rotational angle of the directional mirror 30 exceeds the counterclockwise rotation limit orientation β indicated in FIG. 2, the upper portion of the back 32a of the directional mirror 30, that is, a portion above the tilting fulcrum parts 35, comes into contact with the abutting surface 15a of the upper support 15. In the retracting operation, the rack 42 is further moved forward (in the Y1 direction) by the pinion gear 43.

As a result, the directional mirror 30 is largely rotated counterclockwise with the abutting point between the back 32a and the upper support 15 acting as a fulcrum as illustrated in FIG. 5, so the tilting fulcrum part 35 moves away from the fulcrum support 13. Since the tilting fulcrum parts 35 are urged downward (in the Z2 direction) by the leaf spring 14, which is a biasing member, the teeth 42a of the rack 42 are pressed against the pinion gear 43 due to the biasing force of the leaf spring 14, keeping the rack 42 and pinion gear 43 engaged together.

In a state in which, in the retracting operation, the directional mirror 30 has been largely rotated counterclockwise with the abutting point between the back 32a and the upper support 15 acting as a fulcrum beyond the counterclockwise rotation limit orientation β as illustrated in FIG. 3, the motor 44 stops. When the directional mirror 30 stops in a retracted orientation illustrated in FIGS. 3 and 5, even if external light (sunlight) La is transmitted through the windshield glass 4, passes through the opening 11d in the case 11, and illuminates the reflecting surface 31a of the directional mirror 30, external reflected light Lb directed from the reflecting surface 31a as reflected light proceeds upward and reaches the front, so the external reflected light Lb does not proceed directly to the projecting unit 20. That is, it is possible to prevent the optical axis of the external reflected light Lb from being oriented toward the projecting unit 20. Although the external light La becomes converging light by being reflected on the directional mirror 30 and intermediate mirror 12, this light does not easily enter the projecting unit 20. Even if the light enters the projecting unit 20, the light is not focused at the light source 21, making it possible to protect the projecting unit 20.

In the retracting operation, the directional mirror 30 is rotated counterclockwise with the abutting point between the directional mirror 30 and the upper support 15, provided in the case 11, acting as a fulcrum and the lower end 34 of the directional mirror 30 thereby moves forward (in the Y1 direction) toward space in the case 11, as illustrated in FIGS. 3 and 5. Therefore, the upper end 33 of the directional mirror 30 does not move backward (in the Y2 direction) beyond the abutting point between the directional mirror 30 and the upper support 15.

It will be assumed here that the directional mirror 30 is structured so that its angle is changed only around the tilting fulcrum parts 35. Then, to perform a retracting operation that prevents the external light La from adversely affecting the projecting unit 20 by rotating the directional mirror 30 counterclockwise beyond the counterclockwise rotation limit orientation indicated in FIG. 2, the upper end 33 of the directional mirror 30 needs to be largely moved backward. Therefore, it becomes necessary to further expand the rotation space toward the back of the case 11.

In contrast, in the on-vehicle display device 10 in this embodiment, when the directional mirror 30 is rotated around the tilting fulcrum parts 35 in the adjustment operation, the angle of the directional mirror 30 can be largely changed by the operation of the actuator 41. Since, in the retracting operation, the directional mirror 30 is rotated counterclockwise with the abutting point between the directional mirror 30 and the upper support 15 acting as a fulcrum and the lower end 34 of the directional mirror 30 is thereby moved largely toward space in the case 11, there is no need to provide special operation space required to rotate the directional mirror 30 for the retracting operation. Therefore, a dimension of the case 11 toward its back does not need to be increased.

The on-vehicle display device 10 in this embodiment has a single actuator 41 in the driving unit 40. Due to engagement between the pinion gear 43 and rack 42 of the actuator 41, an adjustment operation and a retracting operation can be performed as a series of operations. Therefore, an adjustment operation and a retracting operation can be smoothly performed by using the actuator 41 with a simple mechanism. In the present disclosure, however, two types of actuators may be provided in the driving unit 40. In an adjustment operation, for example, engagement between a pinion gear and a rack in a first actuator may cause the angle of the directional mirror 30 to change within the range between the clockwise rotation limit orientation α and the counterclockwise rotation limit orientation β. In a retracting operation, a second actuator may be used to largely press a portion below the tilting fulcrum parts 35 of the directional mirror 30 forward (in the Y1 direction).

The case 11 may have a guide rail and a slotted hole guide so that the tilting fulcrum parts 35 can move from its position indicated in FIG. 4 to its position indicated in FIG. 5. The ends of the guide rail and slotted guide on the Y2 side may function as the fulcrum support 13.

Any one of the intermediate mirror 12 and directional mirror 30 may be a plane mirror and the other may be a concave mirror. If a lens having a high magnification ratio is provided in the projecting unit 20, both the intermediate mirror 12 and the directional mirror 30 may be a plane mirror.

What is claimed is:

1. An on-vehicle display device having a projecting unit that outputs projection light, and a directional mirror that reflects the projection light and directs it upward at an oblique angle toward a transparent screen positioned in front of a driver seat, the device comprising:
   a tilting fulcrum part positioned between an upper end of the directional mirror and a lower end of the directional mirror, the tilting fulcrum part being attached to the directional mirror;
   a fulcrum support configured to support the tilting fulcrum part;
   a biasing member configured to provide the directional mirror a biasing force with which the tilting fulcrum part is directly pressed against the fulcrum support;
   an upper support positioned above the fulcrum support so as to face a back of the directional mirror, the back being opposite to a reflecting surface of the directional mirror; and
   a driving unit configured to perform: i) an adjustment operation in which the driving unit provides the directional mirror a force at a position below the fulcrum support so that the directional mirror is tilted in a state in which the tilting fulcrum part is supported by the fulcrum support; and, ii) a retracting operation in which the driving unit provides the directional mirror a force directed forward in a reflection direction so that the back comes into contact with the upper support and the directional mirror is rotated about a point of the contact between the back and the upper support in a state in which the tilting fulcrum part is apart from the fulcrum support.

2. The on-vehicle display device according to claim 1, wherein:
   a position of a virtual image formed in front of the transparent screen relative to a position of the driver seat is adjusted by the adjustment operation; and
   an orientation of the directional mirror is set by the retracting operation so that external reflected light resulting from reflection of external light on the directional mirror does not adversely affect the projecting unit.

3. The on-vehicle display device according to claim 1, further comprising an intermediate mirror configured to direct projection light output from the projecting unit toward the directional mirror, the intermediate mirror being disposed between the projecting unit and the directional mirror.

4. The on-vehicle display device according to claim 3, wherein at least one of the directional mirror and the intermediate mirror is a concave mirror.

5. The on-vehicle display device according to claim 1, wherein the driving unit has an actuator configured to perform the adjustment operation and the retracting operation as a series of operations.

* * * * *